United States Patent
Murchison et al.

(10) Patent No.: US 10,057,234 B1
(45) Date of Patent: Aug. 21, 2018

(54) SYSTEMS AND METHODS FOR PROVIDING NETWORK SECURITY MONITORING

(71) Applicant: Blackpoint Holdings, LLC, Ellicott City, MD (US)

(72) Inventors: Jon Murchison, Ellicott City, MD (US); Christopher Chiu, Washington, DC (US)

(73) Assignee: Blackpoint Holdings, LLC, Ellicott City, MD (US)

( * ) Notice: Subject to any disclaimer, the term of this patent is extended or adjusted under 35 U.S.C. 154(b) by 0 days.

(21) Appl. No.: 15/624,833

(22) Filed: Jun. 16, 2017

Related U.S. Application Data

(63) Continuation of application No. 14/977,079, filed on Dec. 21, 2015, now Pat. No. 9,686,296, which is a continuation-in-part of application No. 14/590,818, filed on Jan. 6, 2015, now Pat. No. 9,240,976.

(51) Int. Cl.
H04L 29/06 (2006.01)

(52) U.S. Cl.
CPC .......... H04L 63/08 (2013.01); H04L 63/0227 (2013.01); H04L 63/1416 (2013.01); H04L 63/1425 (2013.01)

(58) Field of Classification Search
CPC ............. H04L 63/1408; H04L 63/1441; H04L 63/1491; H04L 63/20; H04L 63/18; G06F 21/55

USPC .......................... 726/23, 12, 13, 22; 370/235
See application file for complete search history.

(56) References Cited

U.S. PATENT DOCUMENTS

| | | |
|---|---|---|
| 7,467,408 B1 | 12/2008 | O'Toole, Jr. |
| 8,230,507 B1 | 7/2012 | Njemanze et al. |
| 8,339,959 B1 | 12/2012 | Moisand et al. |
| 8,566,932 B1 | 10/2013 | Hotta et al. |
| 8,661,102 B1 | 2/2014 | Steiner et al. |
| 2011/0067107 A1 | 3/2011 | Weeks et al. |
| 2011/0255538 A1 | 10/2011 | Srinivasan et al. |
| 2012/0254951 A1 | 10/2012 | Munetoh et al. |
| 2014/0298469 A1 | 10/2014 | Marion et al. |
| 2016/0014148 A1 | 1/2016 | Lee et al. |

*Primary Examiner* — Brian F Shaw
(74) *Attorney, Agent, or Firm* — Sterne, Kessler, Goldstein & Fox P.L.L.C.

(57) ABSTRACT

Systems and methods are disclosed for providing network security monitoring in a computer network. In an embodiment, network configuration data may be gathered and processed by a data collector from a plurality of network devices within the computer network. An agent residing on a client device within the computer network may collect network configuration data on the client device and provide the collected network configuration data to the data collector. The network configuration data may be provided to a data analyzer for analysis. A privileged authentication even may then be detected on the client device, and live collection of network metadata related to the detected privileged authentication event may be initiated on the client device upon detecting the privileged authentication event. The network metadata may be provided to the data analyzer for analysis.

20 Claims, 9 Drawing Sheets

SYSTEMS AND METHODS FOR PROVIDING NETWORK SECURITY MONITORING

CROSS REFERENCE TO RELATED APPLICATIONS

This application is a continuation of a prior nonprovisional U.S. patent application Ser. No. 14/977,079, filed Dec. 21, 2015, titled "SYSTEMS AND METHODS FOR PROVIDING NETWORK SECURITY MONITORING," which is a continuation-in-part of a prior nonprovisional U.S. patent application Ser. No. 14/590,818, filed Jan. 6, 2015, now U.S. Pat. No. 9,240,976, titled "SYSTEMS AND METHODS FOR PROVIDING NETWORK SECURITY MONITORING," which are both hereby incorporated herein by reference in their entirety.

BACKGROUND

Field

Embodiments of the systems and methods described herein are generally related to computer network security monitoring and defense.

Background

In recent years, malicious attacks on computer networks have increased dramatically in both number and sophistication. In an attempt to curb such attacks, administrators often use systems known as intrusion detection systems (IDSs). IDSs are used to automatically detect attacks on networks and alert administrators if any attacks are detected.

IDSs typically detect attacks by using a preprogrammed database of traffic pattern signatures. For example, if the IDS detects a particular type of network traffic that it has been preprogrammed to consider malicious, the IDS may determine that the network is being attacked and provide an alert or perform some other remedial action, such as stopping the traffic from the attack. But, whether or not an IDS can detect such an attack is limited by whether the IDS has the signature of the attack. Maintaining such a database of traffic pattern signatures can be difficult because attack signatures change often. Moreover, although the IDS may be able to detect attacks and determine the type of attack, the IDS cannot determine the objectives of an attack. Also, depending on the type of attack, detection may not occur until substantial damage has been inflicted.

IDSs are typically placed at entry and exit points of a network to examine the traffic at such points. But, because the traffic that flows through the entry and exit points can be substantial, IDSs often analyze only a subset of the traffic. Further, because IDSs only monitor traffic at entry and exit points of networks, if an attacker is able to penetrate a network without alerting the IDS, then the attacker can continue to explore and damage a network without any risk of detection.

SUMMARY

Systems and methods are disclosed for providing security monitoring in a computer network. In an embodiment, a service accessible via a network port of a network node within the network is identified. The assigned port number for the identified service is then changed to a second port number. In various embodiments, the assigned port number may be changed on the network node that provides the identified service or at one or more network device elements directing traffic to the identified service. According to an embodiment, one or more configuration rules may be created that specify new port numbers for the identified service, and the assigned port number for the identified service may be changed automatically based on the one or more configuration rules. The one or more configuration rules may be created via a graphical user interface.

In an embodiment, a trap is configured based on one or more criterion. For example, the one or more criterion may include a destination address and a destination port. A trap may be configured to capture network traffic that meets the one more criterion of the configured trap. A data packet is then received. It is determined whether data packet meets criteria set by the configured trap, and if so, the data packet is redirected to a ghost network. In an embodiment, the determining may be based on analyzing the contents (e.g., payload) of the data packet. The ghost network may replicate network services, applications, devices, and/or infrastructure in the computer network. In an embodiment, the ghost network may also include decoy data, such as decoy network nodes and decoy network device elements.

The ghost network may gather activity data based on the redirected data packet. According to an embodiment, one or more redirected data packets may be grouped into a flow of data packets. The gathered activity data may be aggregated based on the flow of data packets and analyzed to identify potentially malicious activity and targeted resources in the computer network. In an embodiment, an alert may be provided based on the flow of data packets.

Additionally, in an embodiment, one or more network nodes in the network may include an agent that records system administration activity on the network node and determines if the recorded activity is potentially malicious. In such a case, an alert may be provided.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Example of a Network Configuration

Figure 1:
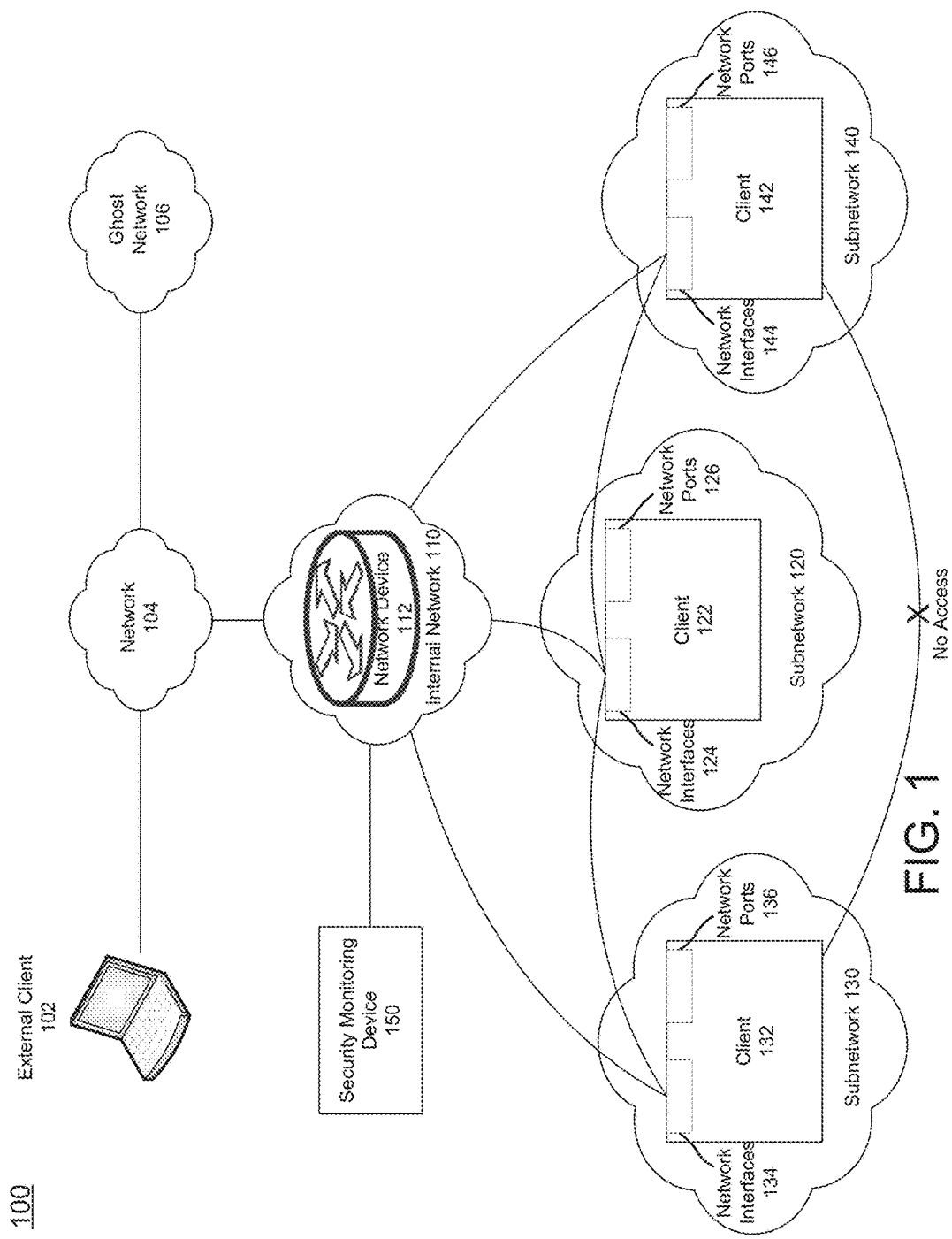
FIG. 1 is a diagram illustrating an example computer network configuration, according to an embodiment.

FIG. 1 is a diagram illustrating an example computer network configuration 100, according to an embodiment. Network configuration 100 includes an internal network 110 coupled to a network 104. Internal network 110 and network 104 may each be any type of computer network capable of communicating data, such as for example, a local area network or a wide-area network (e.g., the Internet), or any combination thereof. Internal network 110 includes a network device element 112, and subnetworks 120, 130, and 140. Network device element 112 may be any type of network device that has visibility of network traffic between network 104 and internal network 110, and/or within internal network 110. For example, network device element 112 may be a router or layer 3 switch, an SDN component, or any other device capable of accessing such traffic. Network device element 112 may also include a firewall having one or more access control lists (ACLs). An ACL is a rule commonly used in firewalls that defines whether traffic able to pass through the firewall.

Network device element 112 may also route network traffic between subnetworks 120, 130, and 140, according to an embodiment. Each subnetwork 120, 130, and 140 may include clients 122, 132, and 142, respectively. Clients 122, 132, and 142 may each be a laptop, desktop, set-top box, mobile device, appliance, server, router, switch, hub, firewall, or any other computing device. In an embodiment, network device element 112 may be connected to clients 122, 132, and 142 via network interfaces 124, 134, and 144.

In an embodiment, clients 122, 132, and 142 are each intended to not be able to communicate with each other. However, client 122 may be misconfigured so that clients 132 and 142 are accessible from client 122 despite the intention that client 122 not be able to communicate with clients 132 and 142. For example, network interfaces 124, 134, and 144 may be configured with different subnet masks that permits inconsistent network access between interfaces, thereby causing an unintended consequence of allowing client 122 to communicate with clients 132 and 142. Alternatively, network device element 112 or clients 122, 132, and 142 may be configured with inconsistent ACLs or Network Address Translation (NAT) rules that permit certain network ports or IP addresses to be accessible from client 122, but not clients 132 and 142.

An attacker that is able to gain access to client 122 may exploit these configuration inconsistencies to cause severe damage to internal network 110. For example, one of the first steps in an attack is mapping a network. The mapping procedure typically includes two parts: (1) identifying clients that exist on the network; and (2) identifying available services on the clients that exist on the network. If the attacker only had access to clients 132 and 142, the attacker would be limited in their ability to map internal network 110 because access to internal network 110 is limited from clients 132 and 142. However, because client 122 has full access to internal network 110, if an attacker gains access to client 122, the attacker can gain access to, and identify, all clients on internal network 110.

Once the attacker has identified the clients that exist on the network, the attacker may then typically determine the network ports available on the identified clients to learn more about the network devices and find vulnerabilities. More specifically, in an embodiment, clients 122, 132, and 142 include network ports 126, 136, and 146, respectively. A network port allows an external client, such as external client 102, remote access to a network service running on a client, such as clients 122, 132, and 142. The network port itself is typically identified by a number from 1 to 65,535. Network services often use well-known default port numbers. For example, the HTTP web service uses port 80 and the HTTPS web service uses port 443. The network ports that are available on a client are an important tool for attackers. More specifically, by knowing the accessible network ports on clients 122, 132, and 142, and attacker may be able to determine the roles of clients 122, 132, and 142 in internal network 110. For example, if an attacker determines that client 122 has an accessible network port on port 80, the attacker may determine that client 122 is a web server. In addition, based on the accessible network ports, an attacker may be able to also determine particular software or operating systems running on clients 122, 132, and 142, which may allow the attacker to perform targeted attacks on clients 122, 132, and 142 based on the particular software or operating system that are vulnerable.

Accordingly, in an embodiment, internal network 110 includes a security monitoring device 150 to prevent such attacks by thwarting and monitoring network mapping activity. Security monitoring device 150 may be coupled to network device element 112 to monitor all traffic within internal network 110. Security monitoring device 150 may be configured to automatically identify vulnerabilities and inconsistencies within internal network 110 and monitor malicious activity related to an attack that occurs within internal network 110.

Example of a Security Monitoring System

Figure 2:
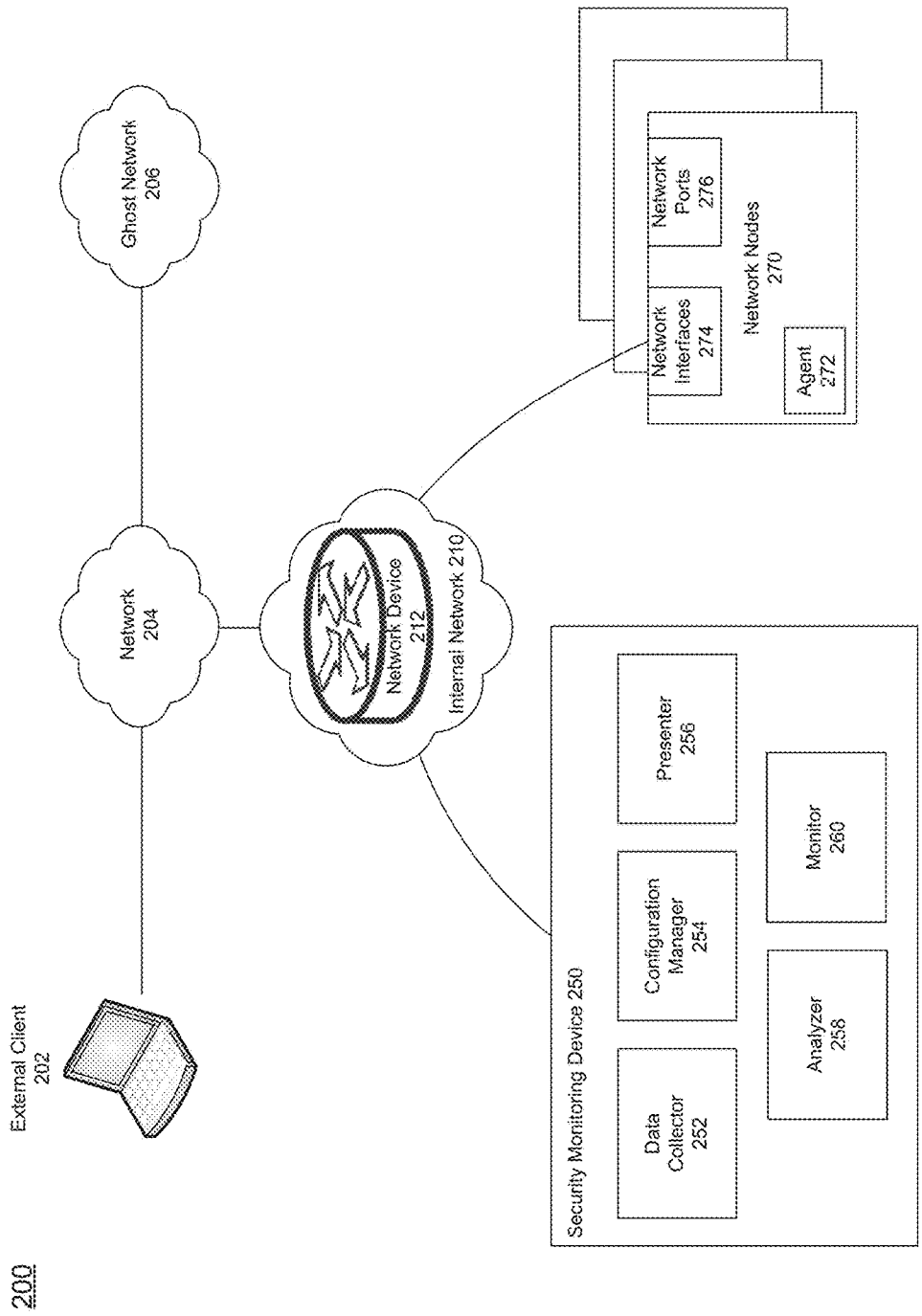
FIG. 2 is an example system for providing security monitoring in a computer network, according to an embodiment.

FIG. 2 depicts an example system 200 for providing security monitoring in a computer network, according to an embodiment. System 200 includes an internal network 210 coupled to a network 204. Internal network 210 and network 204 may each be any type of computer network capable of communicating data, such as for example, a local area network, a wide-area network (e.g., the Internet), or any combination thereof. Internal network 210 includes a network device element 212, security monitoring device 250, and one or more network nodes 270. Network nodes 270 may each be a laptop, desktop, set-top box, mobile device, appliance, server, router, switch, hub, firewall, or any other network device that has configuration information. Network device element 212 may be any type of network device with access to the traffic in, out, and/or within network 210. For example, network device element 112 may be a router or layer 3 switch, an SDN component, or any other device capable of accessing such traffic. In an embodiment, network device element 212 may also include one or more firewalls and switches.

Security monitoring device 250 includes data collector 252, configuration manager 254, and presenter 256, according to an embodiment. Data collector 252 may gather and process network configuration data from network nodes 270 to construct a model of internal network 210. In an embodiment, each of the network nodes 270 may support one or more network management-related protocols for retrieving network configuration. For example, each of the network nodes 270 may support network management-related protocols such as Simple Network Management Protocol (SNMP), Trivial File Transfer Protocol (TFTP), Secure Shell (SSH), Telnet, File Transfer Protocol (FTP), or any other protocol suitable for retrieving configuration data. Configuration data may also be retrieved through vendor specific application programming interfaces (APIs), such as CISCO One Platform Kit. Collection of configuration data may be scheduled for a particular time or frequency, or may occur on an ad hoc basis, according to an embodiment.

Data collector 252 may process collected configuration data to construct a model of internal network 210. For example, data collector 252 may process the configuration data to extract information regarding network interfaces 274 of a particular network node 270. More specifically, data collector 252 may collect the IP addresses, subnets, gateways, domain name service (DNS) server, and media access control (MAC) addresses assigned to the interfaces of network nodes 270. In an embodiment, data collector 252 may also gather routing tables, network address translation (NAT) tables, and ACL data, or VLAN information from any routers, firewalls, switches, and other network devices in network nodes 270.

The constructed model may be used by presenter 256 to provide a visual representation of internal network 210. For example, using collected configuration data, including, but not limited to, the IP addresses and subnets of interfaces 274, ACLs, and routing tables, presenter 256 may calculate and display communication paths between the network nodes. In an embodiment, presenter 256 may display the visual representation in a graphical user interface, such a user interface 300 of FIG. 3.

Configuration manager 254 may be configured to deploy configuration changes and updates to network nodes 270. In an embodiment, configuration manager 254 may automatically identify configuration vulnerabilities or inconsistencies and deploy new configuration to address the identified vulnerabilities and inconsistencies. More specifically, after the configuration data has been collected, configuration manager 254 may observe that the interfaces, routing tables, NAT tables, ACLs, etc. of one or more network nodes 270 are configured inconsistently. For example, as previously discussed, interfaces 274 may be configured with different subnet masks that permits inconsistent network access between interfaces, or network nodes 270 may be configured with inconsistent ACLs that permit certain network ports or IP addresses to be accessible from one interface, but not another. Configuration manager 254 may also be configured to identify vulnerable firmware or other versions of software running on each of the network nodes 270.

In an embodiment, configuration manager 254 may be configured to automatically deploy configuration changes that address the identified vulnerabilities or inconsistencies. Presenter 256 may be configured to display the identified vulnerabilities and/or inconsistencies to a user, and allow the user to select which vulnerabilities/inconsistencies to address, according to an embodiment. In such a case, the user may select an automatic configuration change to the data, or enter a manual change to the configuration data to address the identified vulnerability/inconsistency.

According to an embodiment, configuration manager 254 may also be configured to change the assigned network ports of one or more services running on network nodes 270. As explained above, attackers typically determine the services that are running on a network node based on the port numbers that are accessible at that node. For example, if an attacker determines port 80 is accessible, the attacker may conclude the node is running an HTTP web server service. Once the attacker knows the services a given node is running, the attacker may then be able to determine a large amount of information about the network node, such as its purpose, operating system, type, version, or even its brand and model number. This information may allow the attacker to further refine or continue their attack. But, if the services running on network nodes 270 are not accessible on their well-known default ports, an attacker may not be able to determine which services a computer is running. Well-known ports refer to registered assignments of port numbers to services and applications with the Internet Assigned Numbers Authority (IANA), which are commonly used as default port numbers. For example, if a node is configured to make an HTTP web server service available on a different port than port 80, such as port 5000, an attacker may not be able to determine that the node has an HTTP web server service, or may incorrectly conclude that a node is running a different service, if port 5000 corresponds to a different service.

In an embodiment, configuration manager 254 may be configured to change assigned network ports for these services and applications from well-known ports expected by an attacker. More specifically, configuration manager 254 may change assigned network ports by deploying configuration rules that specify a network node, service or application, current port number, and new port number. Network nodes may be specified by any logical unique identifier, such as an IP address or hostname. In an embodiment, presenter 256 may provide the ability to create configuration rules via a graphical user interface, such as user interface 300 of FIG. 3. In an embodiment, configuration rules and new port assignments may be generated automatically through analysis of existing network configuration data.

Configuration manager 254 may also configure traps based on one or more network ports accessible within internal network 210 to monitor malicious activity within internal network 210. A trap may be configured to capture and/or redirect network traffic destined for one of the network ports specified by the trap. For example, once the assigned network port for a particular service or application has been changed, a trap may be configured based on the originally assigned port number in order to capture potentially malicious network traffic. A trap may also be configured based on the data (i.e. payload) contained within a packet. In embodiment, a trap may be configured as a network address translation (NAT) rule at network device element 212. The trap may also be configured at monitor 260. In such a case, monitor 260 may capture and/or redirect any traffic destined for the port specified in the trap. In an embodiment, traps may also be configured as redirection rules defined via existing software defined networking (SDN) APIs, such as but not limited to, CISCO One Platform Kit or other APIs based on the OpenFlow standard.

Monitor 260 may determine whether network traffic in internal network 210 meets the criteria set by a trap, and then cause the network traffic to be redirected. In an embodiment, the criteria set by a trap may be based on data contained within or derived from incoming data packets, such as but not limited to, the source address, source port, destination address, destination port, vlan id, mac address source or destination, source subnet, payload, packet length, priority, hop count, time to live (TTL), protocol, time received, or any combination thereof. For example, an attacker may target a particular service on a network device. This service may be uniquely identified by an IP address and/or a port number. The service may also be identified by the type of data or packet payload that is exchanged when the service is being accessed. For example, if a trap is set for the HTTP web service, monitor 260 may detect web traffic and determine that the criteria of a trap is met.

Monitor 260 may be located on a control plane that centrally controls the flow of traffic in the network, a technique common in software-defined networking where the control plane is decoupled from the underlying data plane. In this case, monitor 260 may be coupled to multiple routers and/or network devices, virtual machines, or other virtual infrastructure in internal network 210. In an embodiment, monitor 260 may be located in network device element 212 or agent 272.

Network traffic may originate from a source external to internal network 210, such as external client 202 or a source internal to a network such as one or more network nodes 270. When network traffic is captured by a trap, monitor 260 may cause the traffic to be redirected to a ghost network 206, such as ghost network 702 of FIG. 7. Ghost network 206 may be configured to replicate one or more the nodes and/or services in internal network 210 without affecting the actual services or network nodes of internal network 210. The services running within a ghost network are made to appear the same as the actual services that are being replicated, but do not allow access to any resources within internal network 210. For example, a ghost network may emulate a Secure Shell (SSH) service or an internal website provided by a network node 270, but these emulated services do not provide any access to network nodes 270. In an embodiment, internal network 210 is coupled to ghost network 206 via a network 204, such as the Internet. Ghost network 206 may also be located within internal network 210, according to an embodiment.

In an embodiment, ghost network 206 may monitor and examine potentially malicious traffic redirected via monitor 260. This minimizes potential harm to internal network 210 by conducting investigation in an isolated environment, while still providing tools for analysis of potentially malicious activity. The extent of functionality provided by ghost network 206 may vary according to different embodiments. For example, in an embodiment, ghost network 206 may simply acknowledge received traffic and provide an alert to an appropriate party, such as, but not limited to, a network administrator, without allowing any further interaction with ghost network 206. In such a case, if ghost network 206 exposed a web server, ghost network 206 may not provide web server functionality but simply capture traffic destined for a web server port, such as port 80.

In an embodiment, ghost network 206 may fully emulate network services, applications, and infrastructure targeted by the redirected traffic. To an attacker, the network services, applications, and infrastructure targeted would appear fully operational. In such a case, ghost network 206 may also collect additional activity data. This may be accomplished by recording and/or logging interaction with an attacker. In an embodiment, data packets received by ghost network 206 may be grouped into flows of data packets. A flow of data packets may refer to a logical grouping of data packets sent from the same source or subnet to the same destination. For example, a flow of data packets may refer to a single message split between multiple packets or, in the case of Transfer Control Protocol (TCP), a flow of data packets may refer to a sequence of packets sent over a single established TCP connection. In an embodiment, activity data may be gathered from each flow of data packets. Analyzer 258 may use the collected activity data to determine objectives and targeted resources of an attack.

Ghost network 206 may also be seeded with decoy data. For example, in an embodiment, ghost network 206 may include decoy files, folders, share drives, services, network nodes, network connections, or other network infrastructure. This may make it appear that an entire network structure exists within ghost network 206, suggesting additional authenticity to an attacker and encouraging further interaction with ghost network 206. Additionally, the decoy data may aid in identifying targeted resources of an attack. Decoy data, including network infrastructure, may be created manually or automatically through analysis of ingested network configuration data, such as by configuration manager 254.

Ghost network 206 may be generated manually or automatically based on configuration data collected by data collector 252. For example, the network model constructed by data collector 252 may be used to determine relevant network infrastructure and reconstruct appropriate network elements and connections in ghost network 206. For example, ghost network 206 may include decoy switches, routers, storage devices, servers, clients, etc. In an embodiment, ghost network 206 may be generated automatically in part with additional manual input. Input may be specified in a user interface, such as user interface 300 of FIG. 3.

In an embodiment, each network node 270 may include an agent 272. Agent 272 may record system administration activity and privileged authentication events on client network node 270. In an embodiment, the recorded activity may be used by analyzer 258 to determine if the recorded activity is potentially malicious. For example, certain types of malicious activities may not be readily identifiable by monitoring network traffic, such as modifying MICROSOFT WINDOWS group policies, remotely installing software, or any other malicious activity. In such a case, analyzer 258 may provide an alert to an appropriate party, such as but not limited to, a network administrator, when the recorded activity is determined to be potentially malicious. In this manner, agent 272 may monitor potentially malicious activity not captured by traps configured by configuration manager 254.

In order to detect potentially malicious lateral expansion activity in internal network 210, analyzer 258 may subscribe to events monitored by agent 272. For example, analyzer 258 may first subscribe to particular events on a MICROSOFT WINDOWS domain controller within the network, for example, when a new node 270 joins the domain or when a user logs on to a node 270. These types of events may trigger deployment of agent 272 to node 270. In an embodiment, agent 272 may be deployed and reside in-memory on network node 270. In-memory execution of agent 272 creates a minimal footprint on network nodes 270 by minimizing required CPU, storage, and other resource usage.

In an embodiment, analyzer 258 may subscribe to events on the domain controller via a system management service provided by, for example, WINDOWS Management Instrumentation (WMI). WMI provides facilities for remotely accessing management data and operations of WINDOWS network nodes, including domain controllers and end hosts. Analyzer 258 may receive event notifications directly from the domain controller through a programmatic event notification mechanism, such as that provided by WMI. In an embodiment, analyzer 258 may also receive event notifications by monitoring WINDOWS event logs on the domain controller using any suitable mechanism, such as parsing event logs or using WINDOWS APIs to access the event logs. It should be appreciated that WMI and WINDOWS domain controllers are provided by way of example, but the same concepts may apply to other computing platforms and network management technologies, for example to a group of Linux servers connected to a server providing centralized authentication and/or administration services, networked APPLE OS X computers, or mobile devices connected via centralized management and/or authentication mechanisms.

When analyzer 258 detects that a network node 270 has joined internal network 210, according to an embodiment, agent 272 may be deployed to the network node. In an embodiment, agent 272 may be provided directly to a network node 270 by security monitoring device 250 via WMI. This enables agent 272 to be updated without the need to access and modify computer startup or user logon scripts located on a domain controller. Alternatively, agent 272 may be deployed to a node 270 through modification and execution of startup scripts and/or logon scripts located on the domain controller.

Once agent 272 has been deployed, analyzer 258 may monitor internal network 210 for privileged authentication events. That is, analyzer 258 may monitor the domain controller and other network nodes 270 for activity requiring use of, for example, user, administrator, or service credentials. In an embodiment, analyzer 258 may directly subscribe to events on the domain controller via WMI or other network management technologies, as previously described, and agent 272 may subscribe to events on the network node 270 to which agent 272 has been deployed. In an embodiment, agent 272 may receive event notifications from network node 270 through a programmatic event notification mechanism, such as that provided by WMI. Agent 272 may also receive event notifications from network node 270 by directly monitoring WINDOWS event logs on network node 270 using any suitable mechanism, such as parsing event logs or using WINDOWS APIs to access the event logs.

Agent 272 may then inform analyzer 258 of privileged authentication events that occur. In an embodiment, analyzer 258 may receive notifications of events on network nodes 270 via direct communication from agent 272. Analyzer 272 may also receive notifications of events on network nodes 270 through a programmatic event notification mechanism on each network node 270, or by directly monitoring WINDOWS event logs on each network node 270, as previously described. In an embodiment, events may be filtered by analyzer 258 and agent 272, either manually or automatically, to provide alerts only for particular or anomalous privileged authentication events that are detected.

Privileged authentication events may include any event making use of privileged credentials on one or more network nodes 270, for example, but not limited to, logon activity, file share access events, share mounting events, token authentication and validation events, package/software installation processes (e.g., execution of msiexec.exe on a WINDOWS computer), and execution of known administrative commands. These privileged authentication events may generally be indicative of lateral activity within internal network 210.

While monitoring a domain controller may provide alerts to many privileged authentication events, agent 272 enables detection of events that do not require communication with the domain controller. For example, once a user logs into a network node 270 (e.g., a WINDOWS workstation), the node may store an access token in memory that includes user authentication information. This token may be used to perform privileged tasks without requiring the node to communicate with the domain controller. Access tokens may be stolen or abused, known as token theft, and these events are often difficult to detect through analysis of network traffic or domain controller monitoring. Because agent 272 is plugged into network node 270, agent 272 may detect usage of tokens on node 270 and inform analyzer 258.

In the same manner, agent 272 may also be used to detect access to network file shares or share mounting activity through use of a stolen access token. These events similarly may not be logged through the domain controller or node where the share is located. Thus, agent 272 enables detection of such events by monitoring token usage.

One of skill in the art may use the terms token and ticket interchangeably, but a skilled artisan may also attach slightly different meanings to the terms token and ticket. For example, in an embodiment, a token may refer to an identifier that contains security credentials and may be associated with a process or thread privilege, but a ticket may refer to a proof of authentication issued by a particular network server, e.g., a ticket server. Use of the term token in the aforementioned description is intended to mean either token or ticket and applies to both contexts where token and ticket are used interchangeably, as well as contexts where different meanings are attached to the two terms.

In an embodiment, analyzer 258 may provide an alert when a privileged authentication event is detected on a network node 270. This alert may be provided, for example, to a network administrator for further action. In an embodiment, an administrator may be given options to resolve the alert. For example, the administrator may choose to remove network node 270 from the network domain, turn off or restrict the access switch that connects network node 270 to internal network 210, redirect network traffic to and from network node 270 to ghost network 206, or simply ignore the alert when the administrator determines the activity is not malicious. In an embodiment, alerts may be provided in a graphical user interface, such as user interface 300 of FIG. 3, by presenter 256. The alert may be resolved by configuration manager 254 in response to input from the network administrator.

Detection of privileged authentication events may also trigger analyzer 258 and agent 272 to start live collecting network metadata. For example, when a privileged authentication event is detected by agent 272 on a network node 270, agent 272 may collect lists of, for example, running processes and services, IP configurations, ARP cache entries, and lists of shares attached to network nodes 270 within internal network 210. This information may then be compared to previously collected network metadata to identify anomalous activity. For example, process and services lists may be compared against previously collected lists (e.g., lists of running processes and services from yesterday or last week) to quickly identify new processes and services. This differing data may be flagged, and analyzer 258 may again provide an alert to a network administrator or appropriate party for further action. In this manner, the combination of privileged authentication event detection and use of these events to direct live collection of network metadata enables security monitoring device 250 to prevent and terminate malicious lateral expansion activity.

In an embodiment, agent 272 may also provide configuration data about network node 270 to data collector 252. For example, agent 272 may provide any type of configuration information that is stored on network node 270, including, but not limited to, device configuration, make and model information, installed software and its versions, operating system information, information about network interfaces 274, information about network ports 276, DNS configuration, storage configuration, or other network parameters such as ACLs, routing tables, VLAN configuration, ARP tables, running services, open network ports, etc. In an embodiment, agent 272 may also provide additional network metadata from network administration utilities, including, but not limited to, ifconfig, arp, net view, and netstat. Data collector 252 may use the data provided by agent 272 when constructing a model of internal network 210.

Each of the servers, devices, and nodes in FIG. 2 may be implemented on the same or different computing devices having server functionality, in hardware, software, or any combination thereof. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a nontransitory memory, for executing and storing instructions. The memory may tangibly embody the data and program instructions. Software may include one or more applications and an operating system. Hardware may include, but is not limited to, a processor, memory, and graphical user interface display. The computing device may also have multiple processors and multiple shared or separate memory components. For example, the computing device may be a part of or the entirety of a clustered computing environment or server farm.

Figure 7:
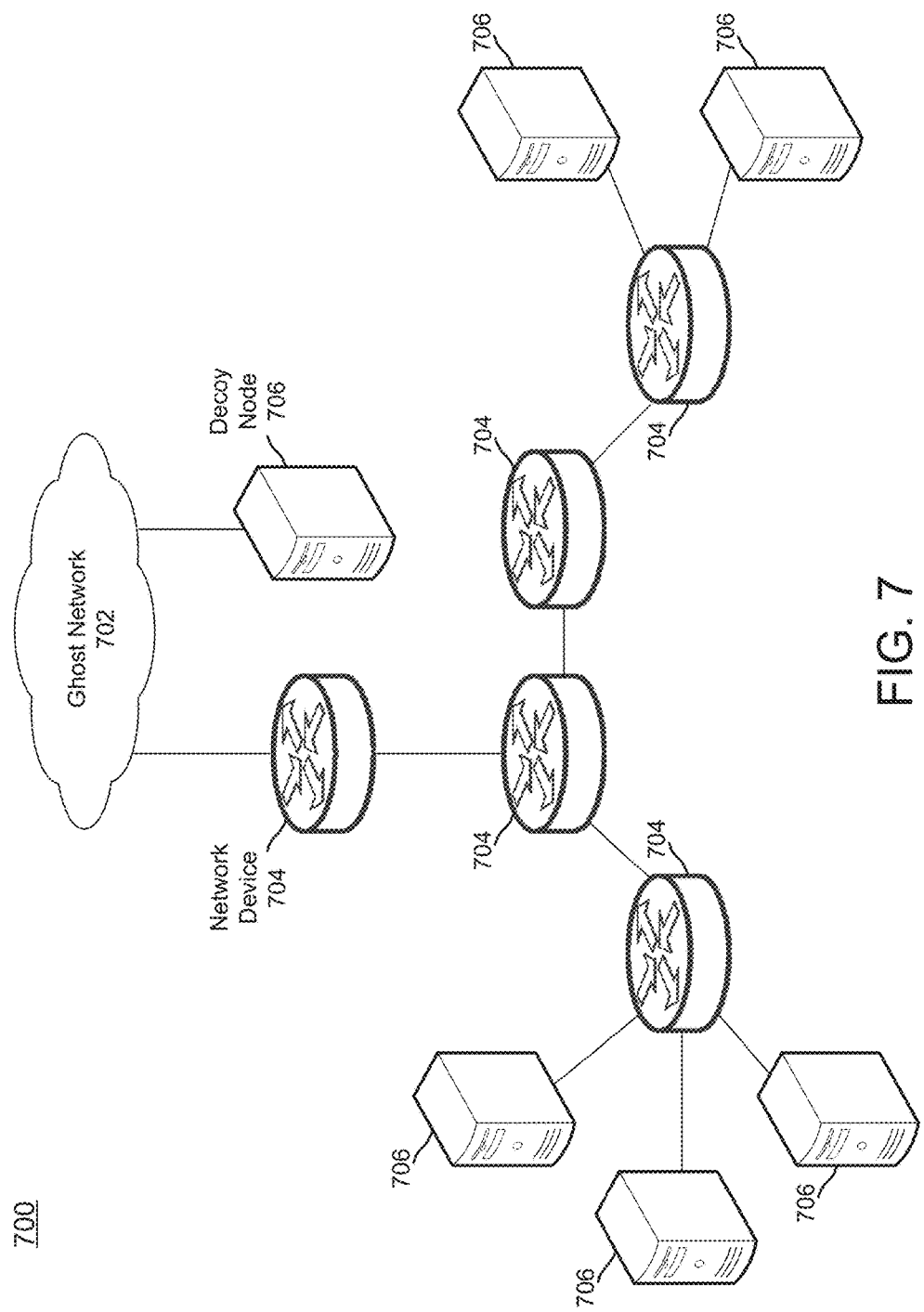
FIG. 7 is a diagram illustrating an example ghost network topology, according to an embodiment.

FIG. 7 depicts an example ghost network topology, according to an embodiment. Ghost network 702 may emulate any type of device or service present within a given network, such as internal network 210 of FIG. 2. For example, ghost network 702 may emulate network nodes (e.g., servers, clients, appliances, etc.), services, applications, and infrastructure provided by internal network 210 of FIG. 2. Ghost network 702 may include one or more network device elements 704 and one or more decoy network nodes 706. In an embodiment, each of network device elements 704 may be any type of network device configured to route and/or manage traffic within ghost network 702, such as but not limited to, a router, layer 3 switch, or firewall. In an embodiment, each of decoy nodes 706 may emulate services and applications provided by network nodes in a network, such as network nodes 270 of FIG. 2. For example, a decoy node 706 may emulate an SSH service or internal website provided by one of network nodes 270 of FIG. 2.

Each network device element 704 and decoy node 706 may be implemented on the same or different computing devices or network appliances. In an embodiment, each network device element 704 and decoy node 706 may be implemented on one or more virtual machines residing on the same or different computing devices. Such computing devices are described above. According to an embodiment, ghost network 702, including network device elements 704 and decoy nodes 706, may be provided and managed by a third-party service.

Example of a User Interface

Figure 3:
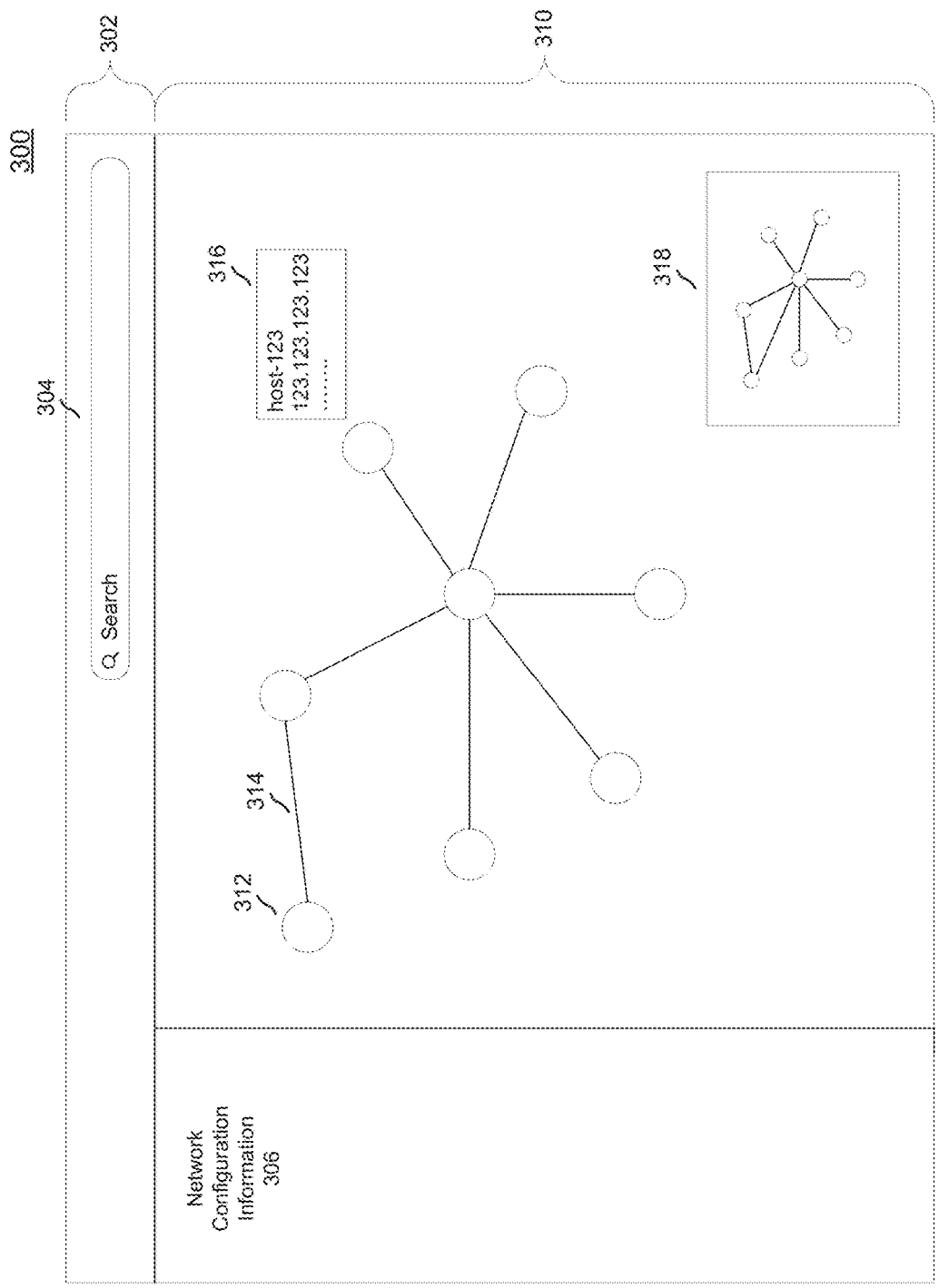
FIG. 3 is an example interface that presents network configuration information, according to an embodiment.

FIG. 3 is an example user interface 300 that presents network configuration information, according to an embodiment. User interface 300 may be displayed in any mechanism capable of displaying graphics, for example, user interface 300 may be displayed in a web application inside a browser or in a native application at a client device. In an embodiment, a presenter, such as presenter 256 of FIG. 2, may provide the user interface 300.

User interface 300 may present configuration information based on models of internal networks, such as internal network 110 and 210 of FIGS. 1 and 2, constructed by a data collector, such as data collector 232 of FIG. 2. User interface 300 includes a pane 302 and a second pane 310. Although user interface 300 depicts pane 302 above pane 310, in an embodiment, pane 302 may be displayed in any position relative to pane 310, or pane 302 and pane 310 may be a single pane. In an embodiment, pane 302 includes a search box 304. Search box 304 may enable a user to retrieve configuration information based on an input search query. For example, a user may be able to search on any type of information gathered by the data collector. Pane 306 displays various network configuration information, such as but not limited to, hostnames of network nodes, descriptions of network interfaces, and descriptions of network management devices in the network. In an embodiment, pane 306 may also display routes between networks and devices displayed within pane 306. The routes may depict whether or not network nodes 312 are able to communicate with each other.

Pane 310 displays a visual representation of the network based on the constructed network model. The visual representation includes network nodes 312 and connections 314 between network nodes. In an embodiment, the displayed visual representation is interactive, allowing a user to view additional detail about network nodes and connections. For example, box 316 displays additional detail about a network node, including a host name and Internet Protocol (IP) address. Box 316 may be displayed in response to input from a user, such as hovering or clicking on a network node 312. Box 316 may display any configuration information collected regarding node 312. In an embodiment, box 318 displays a visual representation of the network from a previous point in time. In such a case, user interface 300 may include selection criteria that allows a user to depict a network at any point in time based on previously collected data. This may be useful for comparison of configuration information.

User interface 300 may also provide the ability to create configuration rules that specify new port numbers for services and applications provided by network nodes. In an embodiment, a user may select a network node in the displayed visual representation to create a new configuration rule. The user interface may then display an additional pane or dialog box allowing the user to specify a service or application provided by the selected network node and a new port to assign. In a further embodiment, the user may specify credentials with privilege to reassign ports on the network node.

In an embodiment, user interface 300 may present identified vulnerabilities and/or configuration inconsistencies, such as those identified by configuration manager 254 of FIG. 2, to a user. The user may then select which vulnerabilities and/or inconsistencies to address. In an embodiment, one or more configuration rules may be automatically created based on an identified vulnerability or inconsistency, without further input from the user. For example, a MICROSOFT Remote Desktop Protocol (RDP) service running on a WINDOWS domain controller server may be presented as a vulnerable service due to potential access to sensitive data. A configuration rule may be automatically created when this vulnerability is selected to reassign the RDP service from the well-known port number 3389 to another port number, for example 10000. In another embodiment, the user may manually create a configuration rule for the selected vulnerability or inconsistency.

Example Method

Figure 4:
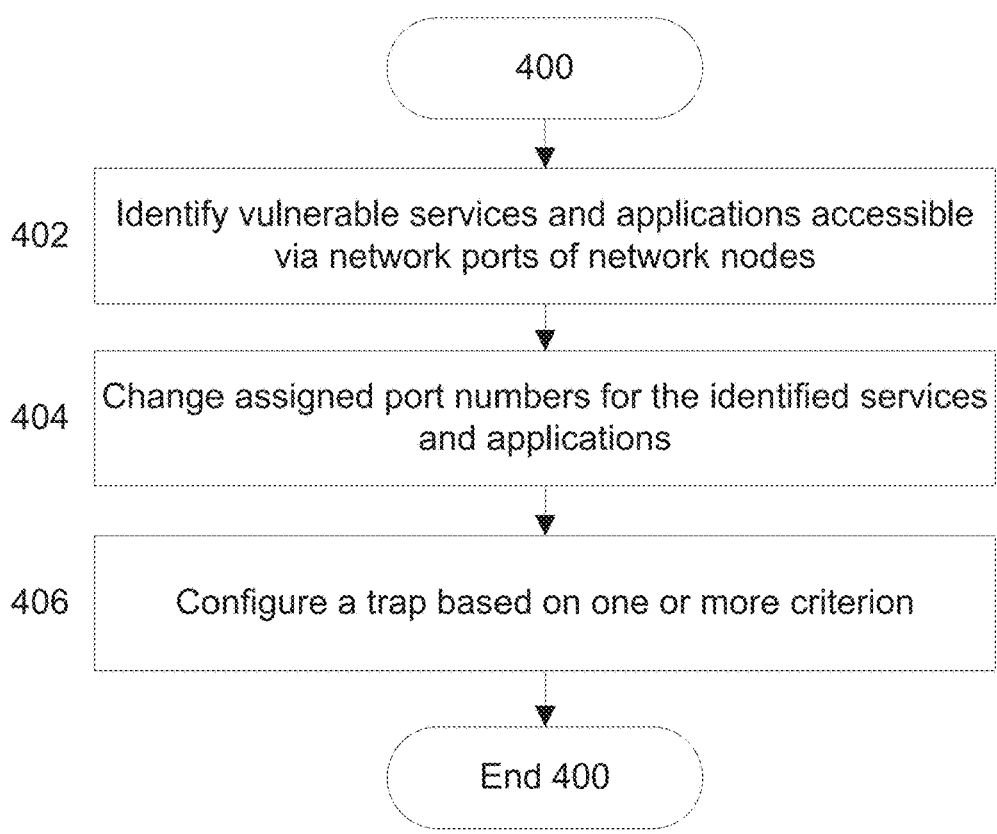
FIG. 4 is an example method for changing the configuration of assigned ports in a computer network, according to an embodiment.

FIG. 4 is an example method for changing the configuration of assigned ports in a computer network, according to an embodiment.

Method 400 begins at step 402 by identifying vulnerable services and applications accessible via network ports of network nodes. In order to make it more difficult for an attacker to identify particular services and applications, it may be beneficial to change well-known port assignments of exposed services and applications. Well-known ports refer to registered assignments of port numbers to services and applications with the Internet Assigned Numbers Authority (IANA), which are commonly used as default port numbers. For example, the Secure Shell (SSH) Protocol is typically assigned to port 22, as registered with IANA.

In an embodiment, vulnerable services and applications may be identified manually by a user, such as, for example, a network administrator. Alternatively, vulnerable services and applications may be identified through analysis of collected network configuration data, such as that performed by analyzer 258 of FIG. 2 or vulnerable services and applications may be identified through a combination of manual and automatic processes. For example, MICROSOFT Remote Desktop Protocol (RDP) is typically assigned to port 3389. This service may be considered vulnerable as successful penetration may expose additional network resources to an attacker, and the service may be automatically identified through analysis of network configuration data.

At step 404, assigned port numbers for the identified services and applications may be changed. In an embodiment, a plurality of rules may be created that specify new ports for the identified services and applications. In a further embodiment, each rule may specify a network node, service or application, current port number, and new port number. Network nodes may be specified by any logical unique identifier, such as an IP address or hostname. In an embodiment, rules may be created by a user via a graphical user interface, such as user interface 300 of FIG. 3. In another embodiment, rules and new port assignments may be generated automatically through analysis of existing network configuration data.

In an embodiment, assigned port numbers may be changed automatically for the identified services and applications based on the created rules, such as by configuration manager 254 of FIG. 2. The created rules may reside on a central server or administration device and contain appropriate credentials with privilege to reassign ports on network nodes. In this manner, port assignments for the identified services and applications may be changed programmatically. For example, using one or more APIs, a configuration manager may be configured to remotely reassign ports on network nodes. The configuration manager may also interact with an agent installed on the network nodes, such as agent 272, to configure port assignments. In such a case, the agent may configure the port assignments using one or more local APIs on the network nodes when contacted by the configuration manager. Alternatively, the agent may be configured to intercept all network traffic at a network node and redirect network traffic based on the port assignments from the configuration manager. In an embodiment, assigned port numbers may automatically be changed at one or more network device elements directing traffic to the identified services and applications by using network address translation (NAT) to map new port numbers to the identified services and applications. This obviates the need to change assigned port numbers on physical network nodes by directing traffic at the network device element based on the new mappings.

At step 406, a trap may be configured based on one or more criterion. In an embodiment, the criteria set by a trap may be based on data contained within or derived from a data packet received within the network, such as but not limited to, the source address, source port, destination address, destination port, vlan id, mac address source or destination, source subnet, payload, packet length, priority, hop count, time to live (TTL), protocol, and/or time received of the data packet. For example, if the port for SSH on a network host has been reassigned from port 22 to another port number, a trap may be configured based on the destination port 22 and the destination address of the network host in an attempt to capture and/or redirect attacks intended for an SSH service of the host. The configured trap may be used to detect potentially malicious behavior and redirect captured traffic for further analysis.

Figure 5:
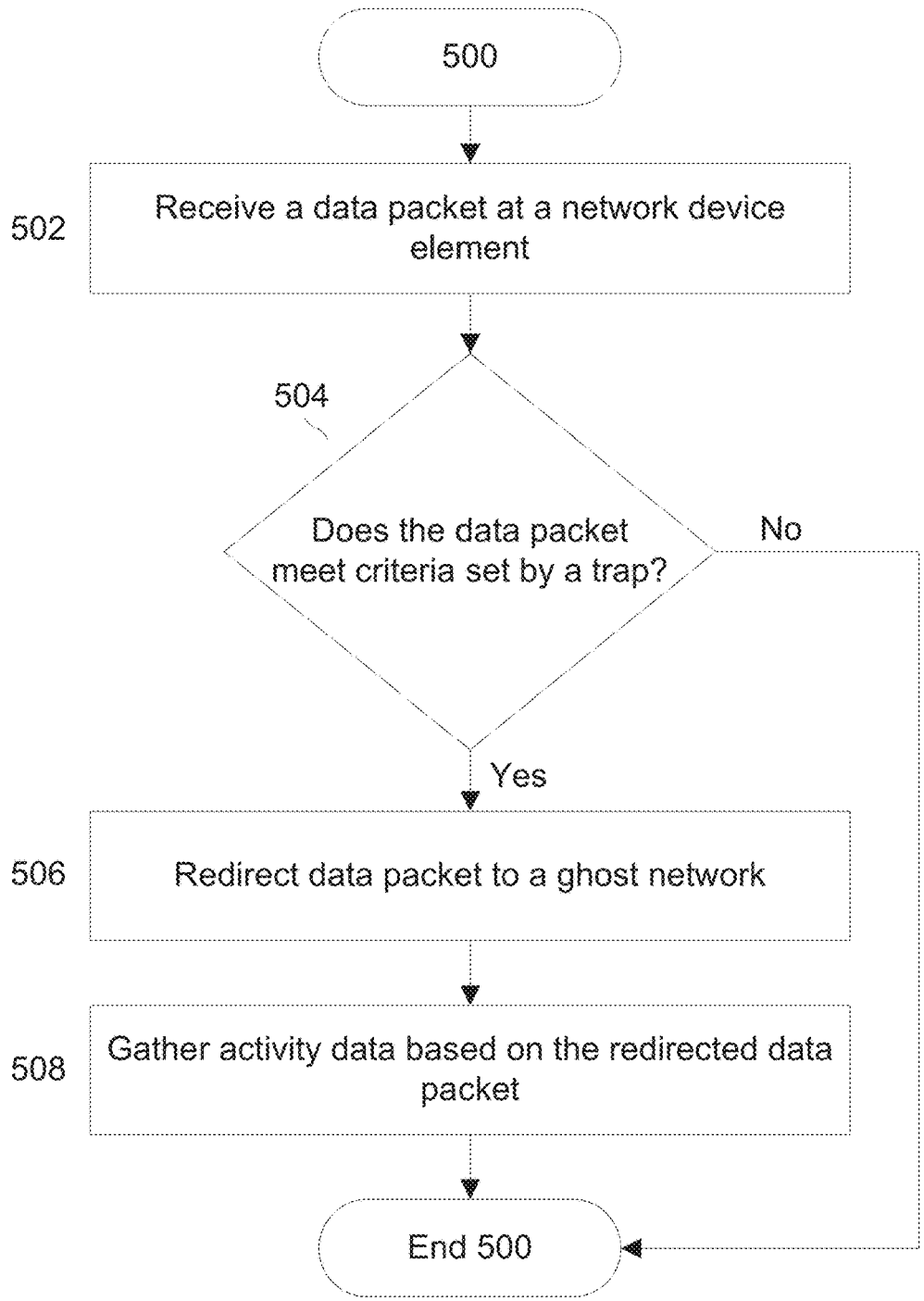
FIG. 5 is an example method for monitoring data packets in a computer network, according to an embodiment.

FIG. 5 is an example method for monitoring data packets in a computer network, according to an embodiment. Method 500 begins at step 502 by receiving a data packet at a network device element capable of routing traffic in the network, such as network device element 212 of FIG. 2. In an embodiment, the data packet may be received from a source external to the network and may include a source address, source port, destination address, and destination port. In an embodiment, the source address and destination address may be Internet Protocol (IP) addresses. In an embodiment, the data packet may be received from a network node within the network, such as network node 270 of FIG. 2.

At step 504, it is determined whether the received data packet meets criteria set by a trap within the network. For example, an attacker may target a particular service on a network device. This service may be uniquely identified by an IP address and/or a port number. In an embodiment, deep packet inspection may be used to inspect the packet to determine its protocol based on an inspection of its payload.

The determination performed in step 504 may be performed by a monitor, such as monitor 260 of FIG. 2. The monitor may be implemented on the network device element that received the data packet, or on a separate server coupled to the network device element. The monitor may be implemented in hardware, software, or any combination thereof. For example, in an embodiment, the determination may be performed on the network device element by consulting a routing table or NAT table in which trap information is stored. The determination may also be determined by examining the contents of the data packet. For example, monitor 260 may be configured to determine the protocol of a particular packet by examining the packet's contents. In an embodiment, the monitor may be part of a controller residing on a separate server that centrally controls the flow of traffic in the network. The controller may also be configured to periodically distribute instructions to the network device element so that the determination may be performed by the network device element, avoiding the need to communicate with the controller for each received data packet.

At step 506, if the received data packet is determined to meet the criteria set by a trap, the data packet is redirected, by the monitor, to a ghost network, such as ghost network 206 of FIG. 2. For example, in an embodiment, if the destination address and destination port of the received data packet correspond to the criteria of one of the plurality of traps, the data packet may be redirected, by the monitor, to a ghost network. In this example, shallow packet inspection may be sufficient to determine whether to redirect the data packet, reducing the bottleneck created by many intrusion detection components. The monitor may also use deep packet inspection to determine whether to redirect the packet to a ghost network, such as by analyzing the packet's payload and/or other fields contained within the packet. As described with respect to FIG. 2, the ghost network may replicate functionality provided by the network node corresponding to the destination address and destination port of the redirected data packet.

Figure 6:
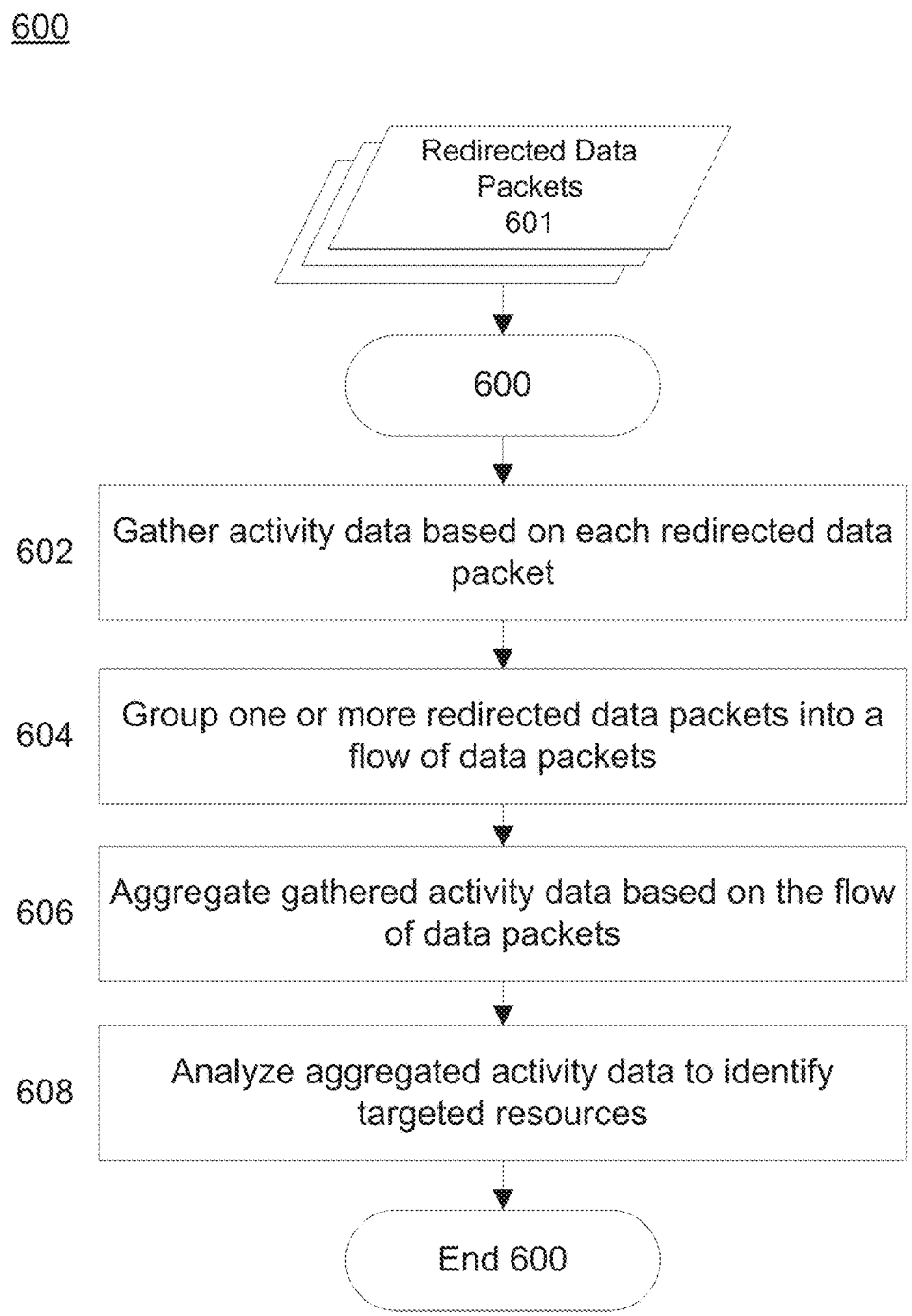
FIG. 6 is an example method for gathering and analyzing potentially malicious activity data, according to an embodiment.

FIG. 6 is an example method for gathering and analyzing potentially malicious activity data, according to an embodiment. While many intrusion detection systems solely focus on detection and filtering of malicious activity, identifying attacker motives and potential resource targets can help to improve security within individual networks.

Method 600 begins by receiving one or more redirected data packets in a ghost network, such as ghost network 206 of FIG. 2. In an embodiment, these data packets may have been redirected by a monitor, such as monitor 260.

At step 602, activity data is gathered based on each redirected data packet. In an embodiment, the ghost network may log data contained in the payload of each data packet. The ghost network may also record or log actions taken in response to the received data packets. The gathered activity data may be combined with header or trailer data contained within each data packet, such as but not limited to, source and destination addresses, source and destination ports, hop count, packet length, and priority, according to an embodiment.

At step 604, one or more redirected data packets may be grouped into a flow of data packets. In an embodiment, a flow of data packets may refer to a logical grouping of data packets sent from the same source or subnet to the same destination. For example, a flow of data packets may refer to a single message split between multiple packets or, in the case of TCP, a flow of data packets may refer to a sequence of packets sent over a single established TCP connection.

At step 606, gathered activity data is aggregated based on the flow of data packets.

At step 608, the aggregated activity data is analyzed to identify targeted resources. In an embodiment, the ghost network may perform the analysis. Alternatively, the analysis may be performed separately, for example by analyzer 258 of FIG. 2. In an embodiment, multiple flows of data packets that relate to the same connection or source may be grouped together in a conversation and analyzed. In such a case, an analysis may be performed on the entire conversation to determine the actions performed during the conversation and the data exchanged. For example, an analysis may reveal that an attacker attempted to access documents or change configuration information of the ghost network.

In an embodiment, a forensic report may be generated based on the analysis of the aggregated activity data. The forensic report may include information including, but not limited to, source and destination information from the redirected packets, a summary of recorded activity, and identified targeted resources. In an embodiment, the forensic report may be generated by the ghost network. Alternatively, the forensic report may be generated separately, for example by analyzer 258 of FIG. 2. The forensic report may be transmitted to an appropriate party, such as but not limited to, a network administrator.

Figure 9:
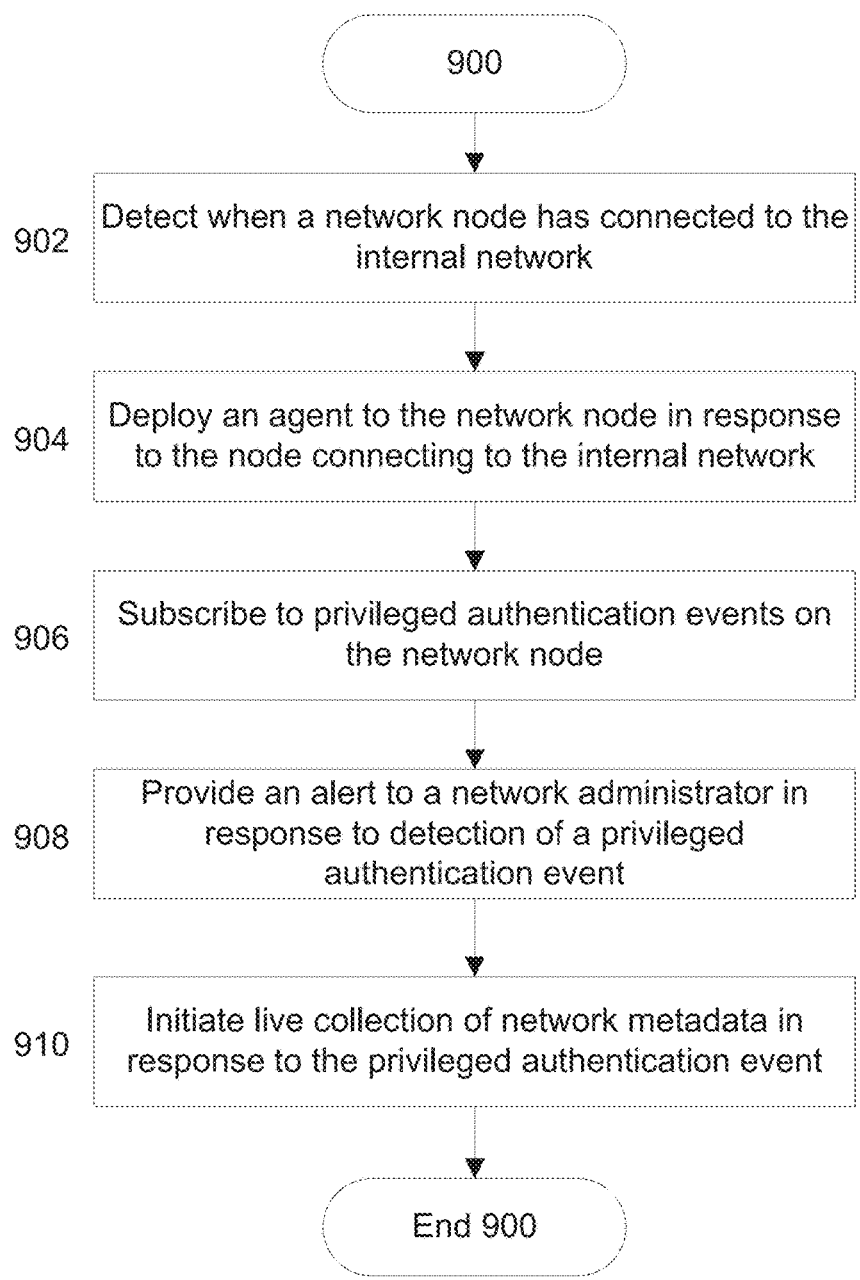
FIG. 9 is an example method for detecting malicious lateral activity within an internal network, according to an embodiment.

FIG. 9 is an example method for detecting malicious lateral activity within an internal network, according to an embodiment. Method 900 begins at step 902 by detecting when a network node has connected to the internal network. For example, an analyzer, such as analyzer 258 of FIG. 2, may subscribe to particular events on a domain controller within the internal network, such as domain join and user logon events. In an embodiment, the analyzer may subscribe to events on the domain controller via a system management service provided by, for example, WINDOWS Management Instrumentation (WMI), as described with respect to FIG. 2. It should be appreciated that WMI and domain controllers are provided by way of example, but the same concepts may apply to other computing platforms and network management technologies.

At step 904, an agent may be deployed to the network node in response to the node connecting to the internal network. In an embodiment, the agent may be provided directly to the network node WMI. This enables the agent to be updated without the need to access and modify computer startup or user logon scripts located on a domain controller. Alternatively, the agent may be deployed to the network node through modification and execution of startup scripts and/or logon scripts located on the domain controller.

At step 906, in order to detect potentially malicious lateral expansion activity, the agent may subscribe to privileged authentication events on the network node. That is, the agent may monitor the network node for activity requiring use of, for example, user, administrator, or service credentials. In an embodiment, the agent may receive event notifications from the network node through a programmatic event notification mechanism, such as that provided by WMI. The agent may also receive event notifications from the network node by directly monitoring WINDOWS event logs on the network node using any suitable mechanism, such as parsing event logs or using WINDOWS APIs to access the event logs. Privileged authentication events may include any event making use of privileged credentials on one or more network nodes, for example and without limitation, logon activity, file share access events, share mounting events, token authentication and validation events, package/software installation processes (e.g., execution of msiexec.exe on a WINDOWS computer), and execution of known administrative commands. These privileged authentication events may generally be indicative of lateral activity within an internal network.

The agent may enable detection of events that do not require communication with the domain controller. For example, once a user logs into a network node (e.g., a WINDOWS workstation), the node may store an access token in memory that includes user authentication information. This token may be used to perform privileged tasks without requiring the node to communicate with the domain controller. Access tokens may be stolen or abused, known as token theft, and these events are often difficult to detect through analysis of network traffic or domain controller monitoring. Because the agent is plugged into the network node, usage of tokens on the node may be detected.

In the same manner, the agent may also be used to detect access to network file shares or share mounting activity through use of a stolen access token. These events similarly may not be logged through the domain controller or node where the share is located. Thus, the agent may enable detection of such events by monitoring token usage.

At step 908, an alert may be provided to a network administrator or other appropriate party in response to detection of a privileged authentication event. In an embodiment, an administrator may be given options to resolve the alert. For example, the administrator may choose to remove the offending network node from the network domain, turn off or restrict the access switch that connects the network node to the internal network, redirect network traffic to and from the network node to a ghost network, such as ghost network 206 of FIG. 2, or simply ignore the alert when the administrator determines the activity is not malicious. In an embodiment, alerts may be provided in a graphical user interface, such as user interface 300 of FIG. 3, by a presenter, such as presenter 256 of FIG. 2.

Finally, at step 910, live collection of network metadata may be initiated in response to detection of the privileged authentication event. For example, when a privileged authentication event is detected on the network node, the agent may collect, for example, lists of running processes and services, IP configurations, ARP cache entries, and lists of shares attached to network nodes within the internal network. This information may then be compared to previously collected network metadata to identify anomalous activity. For example, process and services lists may be compared against previously collected lists (e.g., lists of running processes and services from yesterday or last week) to quickly identify new processes and services. This differing data may be flagged, and an alert again may be provided to a network administrator or appropriate party for further action.

Example Computer System

Figure 8:
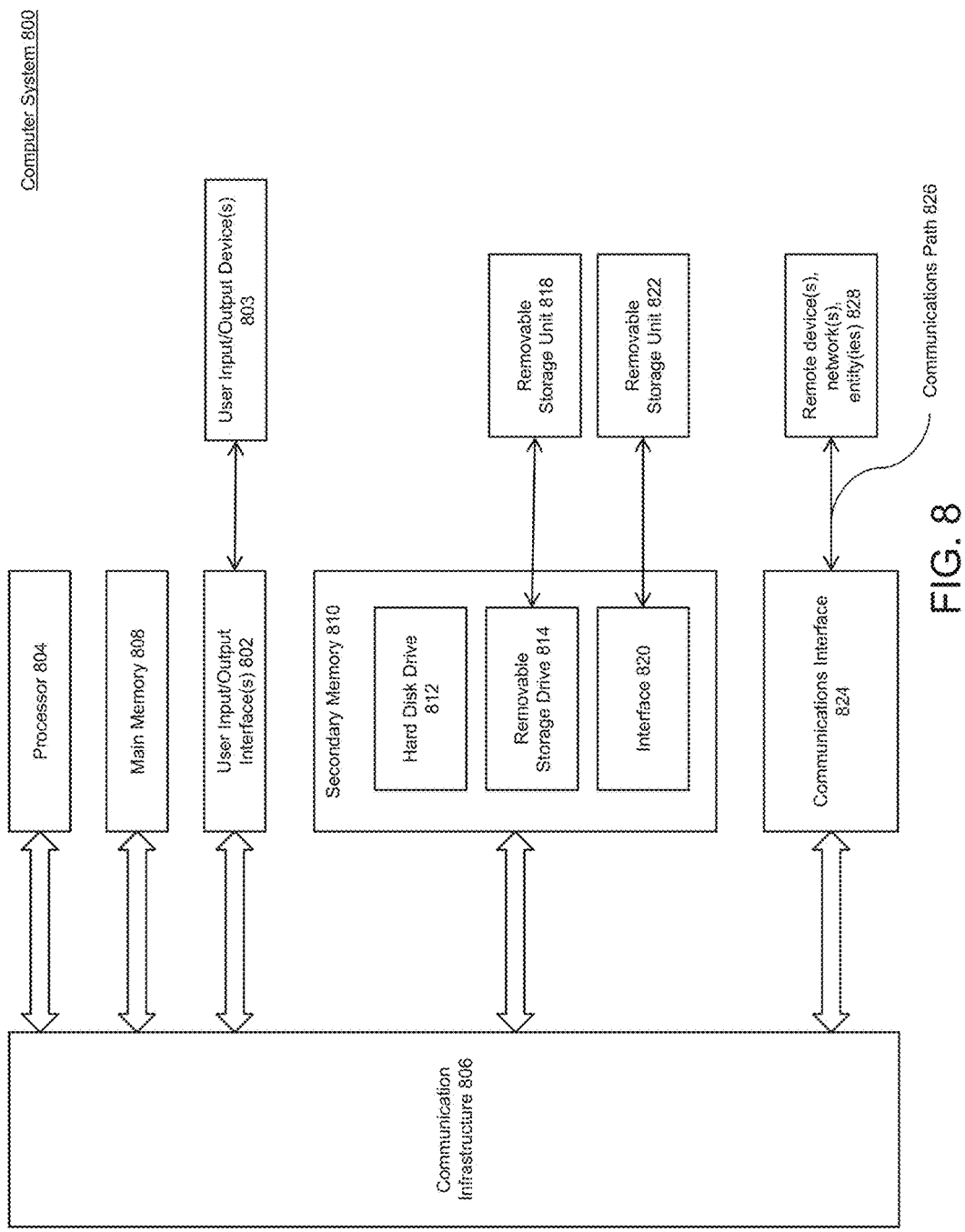
FIG. 8 is a diagram illustrating an example computing device, according to an embodiment.

FIG. 8 is an example computing system useful for implementing various embodiments. Various embodiments can be implemented, for example, using one or more well-known computer systems, such as computer system 800. Computer system 800 can be any well-known computer capable of performing the functions described herein, such as computers available from International Business Machines, Apple, Sun, HP, Dell, Sony, Toshiba, etc.

Computer system 800 includes one or more processors (also called central processing units, or CPUs), such as a processor 804. Processor 804 may be connected to a communication infrastructure or bus 806.

One or more processors 804 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 800 also includes user input/output device(s) 803, such as monitors, keyboards, pointing devices, etc., which communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/or any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use the inventions using data processing devices, computer systems and/or computer architectures other than that shown in FIG. 8. In particular, embodiments may operate with software, hardware, and/or operating system implementations other than those described herein.

CONCLUSION

Identifiers, such as "(a)," "(b)," "(i)," "(ii)," etc., are sometimes used for different elements or steps. These identifiers are used for clarity and do not necessarily designate an order for the elements or steps.

Embodiments of the present inventions have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the inventions that others can, by applying knowledge within the skill of the art, readily modify and/or adapt for various applications such specific embodiments, without undue experimentation, without departing from the general concept of the present inventions. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present inventions should not be limited by any of the above-described embodiments, but should be defined only in accordance with the following claims and their equivalents

What is claimed is:

1. A system for providing network security monitoring in a computer network, comprising:
    a security monitoring server device;
    a data collector, implemented on the security monitoring server device, configured to:
        gather and process network configuration data from a plurality of network devices within the computer network; and
        provide the processed network configuration data to a data analyzer; and
    an agent, implemented on a client device within the computer network, configured to:
        collect network configuration data on the client device;
        provide the network configuration data on the client device to the data collector;
        detect a privileged authentication event on the client device, wherein the detected privileged authentication event comprises event data;
        initiate live collection of network metadata, distinct from the event data, on the client device related to the detected privileged authentication event upon detecting the privileged authentication event; and
        provide the network metadata to the data analyzer.

2. The system of claim 1, wherein the data analyzer is further configured to:
    determine whether the processed network configuration data or the network metadata indicate potentially malicious activity; and
    provide an alert to a network administrator when the processed network configuration data or the network metadata indicate potentially malicious activity.

3. The system of claim 2, wherein to determine whether the processed network configuration data or the network metadata indicate potentially malicious activity the analyzer is further configured to:
    compare the collected network metadata to the processed network configuration data;
    identify anomalous activity based on the comparison; and
    determine that the network metadata indicates potentially malicious activity when anomalous activity is identified.

4. The system of claim 2, further comprising:
    a configuration manager, implemented on the security monitoring server device, configured to resolve the alert based on input from the network administrator.

5. The system of claim 4, wherein the configuration manager is further configured to resolve the alert by removing the client device from the computer network.

6. The system of claim 4, wherein the configuration manager is further configured to resolve the alert by disabling an access switch that connects the client device to the computer network.

7. The system of claim 4, wherein the configuration manager is further configured to resolve the alert by redirecting network traffic to and from the client device to a ghost network, wherein the ghost network is configured to replicate functionality of one or more network nodes in the computer network.

8. The system of claim 1, wherein the privileged authentication event indicates an elevated privileged action taken by a user.

9. The system of claim 1, wherein the network metadata includes at least one of lists of running processes, lists of running services, IP configurations, ARP cache entries, and lists of network shares attached to the network node.

10. A method for providing network security monitoring in a computer network, comprising:
    gathering and processing, by a data collector, network configuration data from a plurality of network devices within the computer network;
    providing the processed network configuration data to a data analyzer;
    collecting, by an agent on a client device within the computer network, network configuration data on the client device;
    providing the network configuration data on the client device to the data collector;
    detecting a privileged authentication event on the client device, wherein the detected privileged authentication event comprises event data;
    initiating live collection of network metadata, distinct from the event data, on the client device related to the detected privileged authentication event upon detecting the privileged authentication event; and
    providing the network metadata to the data analyzer.

11. The method of claim 10, further comprising:
    determining, by the data analyzer, whether the processed network configuration data or the network metadata indicate potentially malicious activity; and
    providing, by the data analyzer, an alert to a network administrator when the processed network configuration data or the network metadata indicate potentially malicious activity.

12. The method of claim 11, wherein determining whether the processed network configuration data or the network metadata indicate potentially malicious activity further comprises:
    comparing the collected network metadata to the processed network configuration data;
    identifying anomalous activity based on the comparison; and
    determining that the network metadata indicates potentially malicious activity when anomalous activity is identified.

13. The method of claim 11, further comprising:
resolving, by a configuration manager, the alert based on input from the network administrator.

14. The method of claim 13, wherein resolving the alert further comprises removing the client device from the network.

15. The method of claim 13, wherein resolving the alert further comprises disabling an access switch that connects the client device to the computer network.

16. The method of claim 13, wherein resolving the alert further comprises redirecting network traffic to and from the client device to a ghost network, wherein the ghost network is configured to replicate functionality of one or more network nodes in the computer network.

17. The method of claim 10, wherein the privileged authentication event indicates an elevated privileged action taken by a user.

18. The method of claim 10, wherein the network metadata includes at least one of lists of running processes, lists of running services, IP configurations, ARP cache entries, and lists of network shares attached to the network node.

19. A non-transitory computer-readable storage device having instructions stored thereon that, when executed by at least one computing device, causes the at least one computing device to perform operations comprising:
gathering and processing, by a data collector, network configuration data from a plurality of network devices within a computer network;
providing the processed network configuration data to a data analyzer;
collecting, by an agent on a client device within the computer network, network configuration data on the client device;
providing the network configuration data on the client device to the data collector;
detecting a privileged authentication event on the client device, wherein the detected privileged authentication event comprises event data;
initiating live collection of network metadata, distinct from the event data, on the client device related to the detected privileged authentication event upon detecting the privileged authentication event; and
providing the network metadata to the data analyzer.

20. The non-transitory computer-readable storage device of claim 19, the operations further comprising:
determining, by the data analyzer, whether the processed network configuration data or the network metadata indicate potentially malicious activity; and
providing, by the data analyzer, an alert to a network administrator when the processed network configuration data or the network metadata indicate potentially malicious activity.

* * * * *